United States Patent [19]
Baum

[11] 3,844,765
[45] Oct. 29, 1974

[54] DIRECT REDUCTION METHOD USING INDUCTIVE HEATING

[76] Inventor: Jesse J. Baum, 10419 Kelso Dr., Sun City, Calif. 92381

[22] Filed: Mar. 6, 1973

[21] Appl. No.: 338,466

Related U.S. Application Data

[62] Division of Ser. No. 119,456, March 1, 1971, Pat. No. 3,740,042.

[52] U.S. Cl............................ 75/10 R, 75/11, 75/62, 75/72, 75/80
[51] Int. Cl............................................. C22d 7/04
[58] Field of Search............ 75/4, 10 R, 11, 36, 37, 75/38, 62, 72, 80

[56] References Cited
UNITED STATES PATENTS

| | | |
|---|---|---|
| 2,545,932 | 3/1951 | Tiddy et al............................ 75/35 |
| 2,729,556 | 1/1956 | Fontana................................ 75/11 |
| 3,264,091 | 8/1966 | Ban....................................... 75/4 X |
| 3,420,656 | 1/1969 | Mekler et al........................ 75/4 X |
| 3,502,461 | 3/1970 | Guttler et al....................... 75/11 X |

*Primary Examiner*—L. Dewayne Rutledge
*Assistant Examiner*—M. J. Andrews
*Attorney, Agent, or Firm*—John J. Byrne

[57] ABSTRACT

A direct reduction apparatus having a means for briquetting oxide ores of iron, manganese, chrome, and copper, with a powdered coal tar pitch, means for caramelizing (hardening) the briquettes for ease of handling, subjecting the caramelized briquettes to a first temperature source until said briquettes are partially reduced to conductivity, their dimensions are substantially reduced and subsequently reducing said briquettes by subjecting them to a frequency electric induction induced heat source.

8 Claims, 3 Drawing Figures

PATENTED OCT 29 1974

3,844,765

DIRECT REDUCTION METHOD USING INDUCTIVE HEATING

This application is a division of Ser. No. 119,456 filed Mar. 1, 1971, now U.S. Pat. No. 3,740,042.

This invention relates to methods and apparatus for directly and continuously reducing metallic ores to iron and steel during a heating step. The principal objective of this invention is to provide apparatus and methods suitable for efficient reduction of iron in remote areas. For example, many small countries, remote areas, islands and other locations, although having sources of ore and power are incapable of economically producing their own iron because of high capital requirements for the construction of recognized commercial methods.

A binder of high melting point coal tar pitch which can be pulverized to a fine powder at ambient temperatures is utilized. Although prior art has used coal tar pitches as a binder reductant, it did not realize the significance of using a type which can be pulverized to pass through a fine grade mesh. Such pitches, because of their low content of volatile matter, do not cause swelling upon the heating thereof. In fact, substantial shrinkage of the briquette occurs during its reduction.

An objective of this invention is to provide a direct reduction process for iron ores incorporating the steps of forming briquettes of a mixture of fine mesh or finely divided particles generally less than 50 mesh of hard grade, high melting point coal tar pitch as a reductant and powdered iron ore that will shrink when partially reduced whereby feeding to further stages of reduction is facilitated.

Another objective of this invention is to provide apparatus and methods for the direct reduction of iron ore wherein an initial heat requirement is obtained through the use of combustible fuels and subsequent heating for final reduction is accomplished through the use of induction electric energy.

A still further objective of this invention is to provide a direct reduction unit and process which utilizes an inclined metallic alloy retort for use in the fuel burning stage of the process and an induction, electrically heated retort for receiving the partially reduced electrically conductive briquettes, for further reduction in a second reduction stage. This electrically heated retort may be conductive (graphite) or non-conductive (alundum).

Another important objective of this invention is to provide a direct reduction unit with the capability of utilizing heat energy from a variety of fuels.

A still further objective of this invention is to provide a reduction unit wherein the construction capital is minimized enabling the system to be utilized in many areas heretofore thought as not feasible for an iron reduction industry.

Another objective of this invention is to provide a system for the reduction of metals having the flexibility to use a plurality of power sources and raw materials which are indigenous to many remote locations. With the low capital investment required to use the methods of this invention, ores can be reduced at remote minesites which can minimize transportation costs.

The methods of this invention also minimize the requirement of highly trained personnel and heavy ancillary equipment such as large cranes and protective buildings. The utilization of the methods and equipment hereinafter described can be taught in a short time to relatively unskilled personnel.

The present invention also relates to a method for mixing finely divided iron ore (or other ores) with finely divided reductant materials such as Gilsonite and other forms of carbon such as fine coke and then compacting such mixtures into dense briquettes up to about 4,000 psi after which the briquettes are heated to a comparatively low temperature of about 300° to 525° F. for thermosetting, caramelizing or hardening after which the briquettes are processed into direct reduced iron by passing them through a direct reduction furnace where they are heated for approximately 15 minutes to about 4 hours at 1,800° F. in the absence of air or of oxygen and then heating to about 2,000° F. to 2,100° F. by subjecting the partially reduced iron to an electric field.

Another objective is in the provision of a method for preparing briquettes of fine iron ore mixed with fine coal tar pitch, the latter comprising 1 to 15 percent by weight, after which the briquette is heated to about 300° F. to about 525° F. to caramelize or harden the pitch binder so that it may be handled without breaking for the purposes of direct reduction of the iron ore to metallic iron.

These and other objects of the invention will become more apparent to those skilled in the art by reference to the following detailed description when viewed in light of the accompanying drawings wherein.

Figure 1:
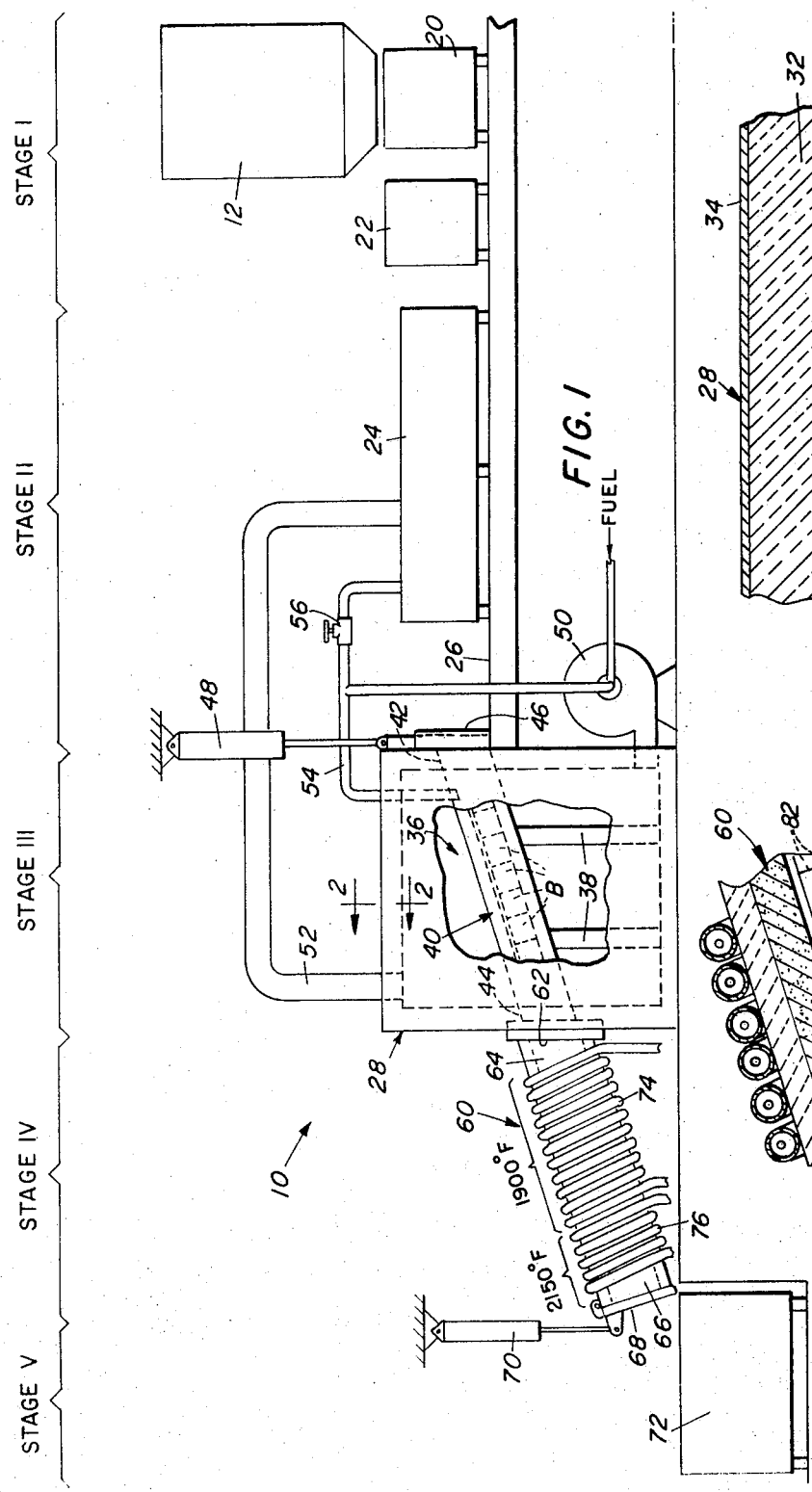
FIG. 1 is a diagrammatic showing of the different stages incorporating the method and construction of the invention.
Figure 2:
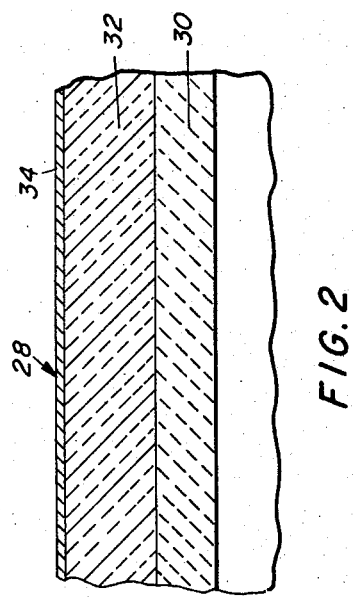
FIG. 2 is a cross-sectional view along the lines 2—2 of FIG. 1.

Generally, this invention consists of taking a finely divided ore concentrate and mixing it with a finely divided carbonaceous reductant-binder, preferably powdered coal tar pitch or a mixture of coal tar pitch with fine carbon or coke. The mixing takes place in the dry state with not more than about 6 percent moisture present using an ordinary paddle or concrete batch type mixer whereby the mixing machine, by rotation or by mechanical agitation, obtains a thorough, intimate and homogeneous mixture throughout. The combined materials are then pressed into hard compact briquettes on an ordinary molding or briquetting machine. At this stage the green briquettes must be handled with care. They are put through a warm oven of about 300° to 525° F. where the pitch is caramelized (hardened) and the briquette becomes hard and tough and may safely be handled by conventional means. This briquette is then ready to charge into a retort tube of the direct reduction furnace so that the ore may be converted directly with or without melting, into metals such as iron, copper, chromium, manganese or other metals. In carrying out the process, the fine ore is mixed with a finely divided carbonaceous thermosetting reductant-binder such as coal tar pitch or Gilsonite along with some fine carbon which acts as a reductant. The finely divided iron ore, for example, 325 mesh, is mixed with finely divided coal tar pitch of about the same mesh, using about 1 to 15 percent pitch by weight and the balance, finely divided coke or carbon reductant, are mixed and formed by pressure into briquettes of about two inches to about 12 inches in diameter by about 2 inches to 8 inches in height. These "green" briquettes are then heated in an oven at 300° to 525° F. to thermoset or caramelize the pitch binder.

The briquettes, now tough and hard, are then heated in a closed retort (during which phase they create their own highly reductive atmosphere) to approximately 2,100° F. The oxygen of the ore is removed by the pitch which is a combination reductant-binder and the fine carbon reductant and an iron briquette in shrunken form consisting of relatively solid metal iron with a slight amount of gangue material, such as silica and alumina, is produced. Quite unexpectedly, this shrunken briquette, about one-half the former volume, is different from the usual sponge iron in that it is relatively nonporous. As the oxygen was removed, the remaining reduced iron particles coagulate or weld together into one dense coherent mass. This is distinctly more valuable and useful than the usual porous low density form of sponge iron produced with the reductants and non-reductant binders such as bentonite of the prior art. The product herein does not have characteristics of ordinary sponge iron because it is highly dense. Thus, it will not soak up water, is not easily reoxidized in the air, and when fed into a molten bath it sinks readily and is easily melted whereas the usual low density sponge iron or reduced iron pellets both of which are light and porous lie on the surface of a molten bath of iron or steel, reoxidize and do not readily melt in.

Referring now to the drawings wherein like elements refer to like parts, the numeral 10 indicates the system of this invention. The first stage in the process is indicated as stage I on the drawings. This station or stage consists of known apparatus for mixing and briquetting the raw materials. Basically, this station includes a vessel diagrammatically shown at 12 for receiving, storing and measuring a mixture of carbon, coal tar pitch and a finely divided ore concentrate. These materials are mixed to a homogeneous mass in the unit 20, wherein about 6 percent moisture added to facilitate adhesion of the pitch to the ore particles. From unit 20, the mixture is fed to a briquetting machine 22 of known design and construction. It has been found desirable to make briquettes of two to ten inches in diameter with half inch holes through the center thereof. For ease of handling, the briquettes are given a length of approximately six to twelve inches. Stage II consists primarily of an oven 24 that preheats the briquettes to 300° to 525° F. at which temperatures certain thermosetting, caramelizing and hardening of the briquettes takes place. The heat source and fuel of this oven is independently or partially supplied from the initial reduction stage by apparatus described more fully hereinafter. After caramelization, the briquettes are brought to the platform area indicated by the numeral 26 where they are fed into an externally fired retort enclosed by the furnace indicated by the numeral 28.

The furnace 28 is lined with a refractory material 30 which is surrounded by an insulating material 32. The exterior of the furnace is covered with a weather resistant siding 34. Within the burning chamber 36 of the furnace several supporting columns 38 of a refractory material support a retort 40 at an inclination of approximately 38°. The retort 40 is constructed of a heat-resistant, but heat conductive, alloy. Its upper opening 42 is disposed near the platform 26 and its lower end 44 exists through an opposite sidewall of furnace 28. A door 46 under the control of a hydraulic cylinder 48 opens and closes the opening 42.

Furnace 28 is fed with burning fuel from a blower combustion unit 50. The top wall of furnace 28 is vented via the conduit 52 to deliver heat from the furnace to caramelizing oven 24. A conduit 54 is provided to exhaust carbon monoxide from the interior of retorts 40 and 60 to the oven 24 where it is utilized as fuel. A valve 56 is provided across line 54 to select and adjust the amount of carbon monoxide fed to oven 24.

In stage I the ore and reductants are mixed and briquetted. In stage II the briquettes are heated from 300° to 525° F. where they are caramelized and hardened. After removal from the oven, the briquettes B are inserted into tube or retort 40 until the tube is fully charged. After charging, the retort door 46 is closed. The combustion which takes place in chamber 36 of the furnace is adjusted so as to bring the temperature of the briquettes within the retort to approximately 1,800° F. The alloy or silicon carbide retort 40 can withstand such temperatures for a considerable length of time and will last many months without replacement. Since the retort 40 is at an angle of repose of approximately 38° to the horizontal, the briquettes are readily moved to a desired position within the retort. However, the friction is sufficient to cause the briquettes to remain at rest when no outside force is exerted.

A considerable amount of metalization occurs during stage III. After several hours, the now shrunken and partially reduced briquettes are pushed into the retort 60 which is coaxially aligned with the retort 40.

The retort 60 may be of an electrically non-conductive material such as silicon carbide or alundum or a conductive material such as graphite. An annular spacer of refractory material 62 is inserted between the alloy retort 40 and the retort 60. The retort 60 has an upper end 64 in communication with the lower end 44 of the retort 40. The lower end 66 thereof is opened and closed by way of a door 68 under the control of a hydraulic cylinder 70. The lower end 66 is disposed immediately over a holding or melting furnace 72.

One or more water-cooled, induction electric power coils 74 and 76 are disposed about the retort 60. The power coil 74 emits a frequency and power input sufficient to raise the briquettes to a temperature of approximately 1,900° F. and the coil 76 emits a frequency and power input sufficient to raise the temperature of the briquettes to approximately 2,150° F. At these temperature ranges, substantially full reduction occurs, and the solid metallic briquettes may be discharged into the holding furnace 72. If molten metal is desired, the temperature range is raised to about 2,350° to 2,750° F. by increasing the electrical power input so that the briquettes will be melted and the molten metal drained into the holding furnace.

Figure 3:
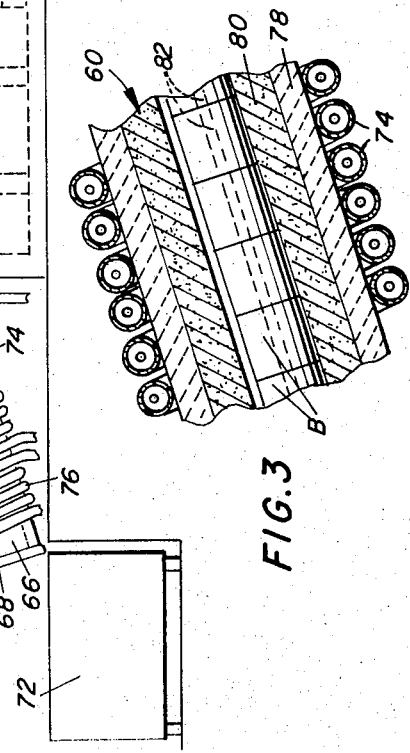
FIG. 3 is a sectional view of one element shown in FIG. 1.

As seen in FIG. 3, the retort 60 can be constructed of an outer cylinder 78 of silicon carbide (or other non-conductive material such as alundum) and an inner liner 80 of graphite. The graphite presents a smooth, non-melting, non-sticking surface to the reduced metal to thereby reduce abrasion, adhesion, and friction, and increase the life of the retort.

The briquettes are of a size slightly less than the inner dimensions of the retort and have lengths determined by handling considerations. Lengths of from 6 to 12 inches have been found desirable. The interiors of the briquettes are formed with passageways 82 so as to facilitate the escape of carbon monoxide and other gases and to decrease the time necessary for reduction.

In a general manner, while there have been disclosed effective and efficient embodiments of the invention, it should be well understood that the invention is not limited to such embodiments as there might be changes made in the arrangement, disposition, and form of the parts without departing from the principles of the present invention as comprehended within the scope of the accompanying claims.

I claim:

1. A direct reduction process comprising the steps of providing metal ore concentrate in finely divided form, said metal being selected from the group consisting of iron, copper, manganese and chromium, intermixing at least one of said ore concentrates intimately with a finely divided thermosetting reductant-binder and six percent moisture, pressing the intermixture of ore concentrate, moisture, reductant-binder and carbon into hard and dense briquettes having dimensions of at least two or more inches in diameter and two or more inches in height, heating said briquettes to a temperature range of from 300°F to 525°F thereby driving off moisture and volatile material from said briquettes and caramelizing the reductant-binder to form a tough, hard briquette of sufficient strength to be handled by conventional means, inserting said briquettes into a said first inclined tube, heating said briquettes within said tube in the absence of oxygen to a temperature of about 1,800°F thereby causing the caramelized carbonaceous reductant-binding to react with the oxide ore concentrate to reduce substantially all of the latter to free metal in finely divided form and to agglomerate the finely divided free metal particles into a briquette whose size has been substantially diminished to up to fifty percent of its former volume, said briquette having low porosity, high density and highly improved electrical conductivity, and inserting or transferring said briquettes of diminished size directly while hot into a second tube and heating the same by means of an electric induction coil to a temperature ranging from either 1,900°F to 2,150°F or 2,350°F to 2,750°F.

2. The invention of claim 1 wherein said second tube is of an electrically conductive material.

3. The invention of claim 1 wherein the heating in said first tube results from the burning of a combustible fuel.

4. The invention of claim 3 wherein a portion of the heat about said first tube is recycled to form a part of the heat required to caramelize the briquettes.

5. The invention of claim 1 wherein said second tube is of an electrically non-conductive material.

6. The invention of claim 5 wherein said first and second tubes are continuous and coaxial.

7. The invention of claim 1 wherein said second tube has an outer surface of a material having a high degree of resistance to damage from heat and an inner layer of conductive material.

8. The invention of claim 7 wherein said inner layer is graphite.

* * * * *